US009915048B2

(12) United States Patent
Jie et al.

(10) Patent No.: US 9,915,048 B2
(45) Date of Patent: Mar. 13, 2018

(54) METHOD FOR RIVER/LAKE LEVEL REGULATION AND WATER CONSERVANCY SYSTEM

(71) Applicant: JIANGXI PROVINCE FENGHE YINGZAO GROUP CO., LTD., Nanchang (CN)

(72) Inventors: Baoru Jie, Nanchang (CN); Jiangang Jie, Nanchang (CN); Daxin He, Nanchang (CN); Shuangxi Zhou, Nanchang (CN); Jue Li, Nanchang (CN); Jie Fu, Nanchang (CN); Wujin Tao, Nanchang (CN)

(73) Assignee: FENGHE YINGZAO GROUP, INC., Nanchang (CN)

( * ) Notice: Subject to any disclaimer, the term of this patent is extended or adjusted under 35 U.S.C. 154(b) by 0 days.

(21) Appl. No.: 15/039,757

(22) PCT Filed: Dec. 4, 2013

(86) PCT No.: PCT/CN2013/088523
§ 371 (c)(1),
(2) Date: May 26, 2016

(87) PCT Pub. No.: WO2015/081516
PCT Pub. Date: Jun. 11, 2015

(65) Prior Publication Data
US 2017/0002532 A1    Jan. 5, 2017

(51) Int. Cl.
*E02B 3/10*      (2006.01)
*E02B 1/00*      (2006.01)
(Continued)

(52) U.S. Cl.
CPC ............. *E02B 3/10* (2013.01); *E02B 1/003* (2013.01); *E02B 3/02* (2013.01); *E02B 8/06* (2013.01); *E02B 9/00* (2013.01)

(58) Field of Classification Search
CPC combination set(s) only.
See application file for complete search history.

(56) References Cited

U.S. PATENT DOCUMENTS 1,376,889 A * 5/1921 Kirby .................... E02B 5/082
                                              405/107
3,779,385 A * 12/1973 Strohecker ............... E03F 5/16
                                              210/154
(Continued)

FOREIGN PATENT DOCUMENTS

CN        101045585 A      10/2007
CN        101092815 A      12/2007
(Continued)

*Primary Examiner* — Kyle Armstrong
(74) *Attorney, Agent, or Firm* — Greer, Burns & Crain, Ltd.

(57) ABSTRACT

A method for river/lake level regulation and a water conservancy system. The method for level regulation employs a non-closure mode; a water reservoir system is built on one side of a river/lake, water from the river/lake enters into the reservoir system when the water level of the river/lake exceeds a warning water level, and the river/lake is replenished with the water stored in the reservoir system when the water level of the river/lake is unduly low; the conservancy system, which employs the non-closure mode, is built on one side of a river/lake waterway and includes the water reservoir system and a first water passage, the water reservoir system communicates with the river/lake waterway through the first water passage. The method for river/lake level regulation and the water conservancy system realize river/lake level regulation during drought and flood periods without any river/lake closure, so that water resources are control effectively.

12 Claims, 8 Drawing Sheets

(51) Int. Cl.
    *E02B 3/02*     (2006.01)
    *E02B 8/06*     (2006.01)
    *E02B 9/00*     (2006.01)

(56) References Cited

U.S. PATENT DOCUMENTS

| | | | | |
|---|---|---|---|---|
| 5,795,106 | A * | 8/1998 | Herd | E02D 29/02 405/284 |
| 8,877,048 | B1 * | 11/2014 | Owings | E03F 1/002 210/170.03 |
| 2008/0101867 | A1 * | 5/2008 | McLaughlin | E02B 8/08 405/83 |
| 2008/0253837 | A1 * | 10/2008 | Miller | E02B 9/02 405/80 |
| 2014/0056645 | A1 * | 2/2014 | Hogan | G01W 1/10 405/80 |

FOREIGN PATENT DOCUMENTS

| | | |
|---|---|---|
| CN | 101319492 A | 12/2008 |
| CN | 101831875 A | 9/2010 |
| CN | 102329000 A | 1/2012 |
| CN | 102444630 A | 5/2012 |
| JP | 2004-293199 A | 10/2004 |

\* cited by examiner

METHOD FOR RIVER/LAKE LEVEL REGULATION AND WATER CONSERVANCY SYSTEM

BACKGROUND

The present invention relates to the field of water conservancy construction and in particular to a non-closure water conservancy system.

Water is one of the resources indispensable for the survival, and scientific and effective regulation and control of water resources is a necessary way to benefit mankind. For thousands of years, mankind has to pay for the use of water resources with endless efforts and lives, and flood inundations have taken countless precious lives and properties. After decades of efforts, the transformation of the two major river/lake system has made significant achievements in north and south China, and the river closure of the Three Gorges of Yangtze River and the closure of Xiaolangdi of Yellow River are successful models.

The existing closure-type water conservancy project not only cannot solve the problem of flood control in midstream and downstream areas, but also would instead exacerbate floods in upstream area, causing droughts in downstream area and causing significant sediment deposition due to the destruction of vegetation, leading to a serious impediment to the development of shipping, meanwhile resulting in a large number of immigrants which increases the burden on the government and the people, and the greatest harm is the serious damage to the ecosystem, causing imbalance of aquatic habitat and, over time, endangerment to some of the aquatic life, or even inducing earthquakes and climate change disorders. There are also significant security risks on war preparedness, and cities and villages around the reservoir will be destroyed once war takes place in future.

To make better use of freshwater resources, study of a non-closure water conservancy system has great significance to society and environment.

SUMMARY

In view of the defects of the closure-type water conservancy system in prior art, the technical problem to be solved by the present invention is to realize regulation of the water level of the river/lake without closure of the river/lake.

To achieve the above object, the technical scheme of the invention is to provide a non-closure water conservancy system, which realizes regulation of river/lake water level during drought and flood without closure of the river/lake. The non-closure system is suitable to be built in urban areas with relatively small population downstream of the city, and non-farm zones with low-lying area at shoreline where the river/lake is wide. Estimate and plan water storage volume of non-closure water conservancy system according to local hydrological data and research on the maximum rainfall in hundred years and the natural environment in drought periods, so that it can effectively regulate water resources by storing the water in the reservoir in flood duration and discharging the water in drought periods. The high-capacity reservoir may also be designed with a hydroelectric system, the reservoir dam not only acts as a land and water transportation hub, but also as a good place for tourism and recuperation.

In one aspect, the invention provides a method for regulation of a river/lake level, wherein a non-closure mode is employed, a water storage system is built on one side of a river/lake, water from the river/lake enters into the water storage system when the river/lake level exceeds a warning level, thereby lowering the river/lake level or reducing the rising velocity of the river/lake level; the river/lake is replenished with the water stored in the water storage system when the river/lake level is unduly low, thereby increasing the river/lake level or reducing the lowering velocity of the river/lake level.

Further, a first water passage is arranged at one side of an embankment of the river/lake to connect the river/lake with the water storage system.

Further, a second water passage is arranged downstream of the first water passage to connect with the river/lake and the water storage system.

Further, the first water passage and the second water passage are provided with a sluice. Preferably, the inlet of the first water passage is provided with a sluice; the inlet of the second water passage is provided with a sluice.

In another aspect, the invention provides a water conservancy system, wherein the water conservancy system employs a non-closure mode, built on one side of a river/lake waterway and comprising a water storage system and a first water passage, the water storage system communicated with the river/lake waterway through the first water passage.

Further, the water conservancy system further comprises a second water passage arranged downstream of the first water passage and connecting the water storage system with the river/lake waterway.

Further, the water storage system comprises a first precipitation reservoir and a storage reservoir, the first precipitation reservoir and the storage reservoir communicated through water passages, the first water passage connecting the first precipitation reservoir with the river/lake waterway, the second water passage connecting the storage reservoir with the river/lake waterway.

Further, the water storage system further comprises a second precipitation reservoir communicated respectively with the first precipitation reservoir and the storage reservoir, the river/lake water enters into the first precipitation reservoir through the first water passage for a preliminary precipitation and, after that, enters into the second precipitation reservoir for another precipitation before entering into the storage reservoir, the first water passage connecting the first precipitation reservoir with the river/lake waterway, the second water passage connecting the storage reservoir with the river/lake waterway.

Further, the dam of the water conservancy system is a stepped curved slope protection concrete structure, the height of the dam exceeding the highest water level in flood periods in a century. The actual height can be determined according to the geographical position and expected effects of the water storage system. Preferably, the dam at the side adjacent the river/lake waterway is a concrete structure, and the dam at the other side is a rubble structure.

Further, a plurality of the first water passage is arranged on the dam between the first precipitation reservoir and the river/lake waterway. Preferably, the inlet of the first water passage is provided with a separation net for preventing the floating debris from entering, and a regulatory sluice is provided at the inlet for the regulation of river/lake water into the first precipitation reservoir. Preferably, the bottom of the first water passage levels with the mean annual water level, and the top of the first water passage levels with the highest water level in flood periods in a century.

The structure of the first precipitation reservoir of the invention can be a regular structure in the field. Preferably, a truss structure is arranged inside the first precipitation reservoir, on the dams at two sides of the first precipitation reservoir. The truss structure is a concrete member or steel member, bearing the flood impact and water pressure from the river/lake and acting to transmit forces, and bearing the reverse water pressure from the precipitation reservoir and storage reservoir and acting to significantly stabilize the dam when the flood retreats back to natural water level.

Further, a plurality of sets of automatic overflow passages are provided on the dam between the first precipitation reservoir and the second precipitation reservoir, so as to connect the first precipitation reservoir with the second precipitation reservoir. Preferably, at least four sets of automatic overflow passages are provided, which, respectively, are: a first set of automatic overflow passages, a second set of automatic overflow passages, a third set of automatic overflow passages, and a fourth set of automatic overflow passages, with a separation net provided at the inlet of each of the overflow passages; wherein the first set of automatic overflow passages levels with the low water level in drought periods in a century, the second set of automatic overflow passages levels with the mean annual water level, the third set of automatic overflow passages levels with the warning water level in flood periods, and the fourth set of automatic overflow passages levels with the highest water level in flood periods in a century. Each set of automatic overflow passages is in parallel arrangement on a same horizontal plane, and the number of each set of automatic overflow passages is not limited; in a preferred embodiment, the total area of the first set of automatic overflow passages being less than the total area of automatic overflow passages in each of other sets. In a more preferred embodiment, not only the automatic overflow passages are arranged between the first precipitation reservoir and the second precipitation reservoir, but also a drainage mechanism can be arranged, to pump the flood water exceeding the warning level from the first precipitation reservoir into the second precipitation reservoir.

The structure of the second precipitation reservoir of the invention can be a regular structure in the field.

Further, a plurality of sets of automatic overflow passages are provided on the dam between the second precipitation reservoir and the storage reservoir, so as to connect the second precipitation reservoir with the storage reservoir. Preferably, at least four sets of automatic overflow passages are provided, which, respectively, are: a first set of automatic overflow passages, a second set of automatic overflow passages, a third set of automatic overflow passages, and a fourth set of automatic overflow passages; wherein the first set of automatic overflow passages levels with the low water level in drought periods in a century, the second set of automatic overflow passages levels with the mean annual water level, the third set of automatic overflow passages levels with the warning water level in flood periods, and the fourth set of automatic overflow passages levels with the highest water level in flood periods in a century. Each set of automatic overflow passages is in parallel arrangement on a same horizontal plane, and the number of each set of automatic overflow passages is not limited; in a preferred embodiment, the total area of the automatic overflow passages in the first set of automatic overflow passages being less than the total area of the automatic overflow passages in each of other sets. Preferably, the inlet of at least the fourth set of the automatic overflow passages is provided with a separation net. The water exceeding the warning level is automatically drained by the automatic overflow passages in the second precipitation reservoir into the storage reservoir. In a preferred embodiment, a power generating facility can be installed in the water passage connecting the second precipitation reservoir with the storage reservoir, so that the water in the second precipitation reservoir flows into the storage reservoir after generating power to make full use of water resource to produce cycling benefit.

The storage reservoir structure of the invention can be a regular structure in the field.

Further, a plurality of the second water passage is provided on the dam between the storage reservoir and the river/lake waterway; a regulatory sluice is provided at the inlet of the second water passage, for the regulation of the entering of the water from the reservoir water into the river/lake waterway; the bottom of the second water passage levels with the low water level in drought periods in a century, and the top of the second water passage levels with the highest water level in flood periods in a century. Preferably, a hydroelectric system or irrigation system is provided in the second water passage.

In other embodiments of the invention, a power driven drainage system may be provided between the river/lake waterway and the first precipitation reservoir, between the first precipitation reservoir and the second precipitation reservoir, between the second precipitation reservoir and the storage reservoir, and between the storage reservoir and the river/lake waterway, for facilitating the entering and exiting of water.

In the present invention, the main function of the first precipitation reservoir is to introduce the flood water exceeding the warning water level in flood periods into the reservoir, so as to allow for self-precipitation, and the water will be automatically discharged into the second precipitation reservoir when the water level in the first precipitation reservoir reaches a certain height; when a drainage mechanism is arranged, the flood water exceeding the warning water level in the first precipitation reservoir is pumped into the second precipitation reservoir by the drainage mechanism. The water will be automatically discharged into the storage reservoir when the water level in the second precipitation reservoir reaches a certain height. The storage reservoir can act to regulate drought and flood by discharging water or generating electricity in drought duration when the water volume is large. When the water level exceeds the flood water level, the regulatory sluice of the first water passage is opened to introduce the water from the river/lake into the first precipitation reservoir, then introducing the water from the first precipitation reservoir into the second precipitation reservoir through the automatic overflow passages. When the river/lake water level is low, the water in the storage reservoir can be supplied to the river/lake through the second water passage, so as to regulate the water level. Electricity can be generated from water during discharging out and in, and the water in the storage reservoir, after two times of precipitation, can also be utilized for irrigation and domestic use.

The water conservancy system noted in the invention is suitable to be built in urban areas with relatively small population downstream of the city, and non-farm zones with low-lying area at shoreline where the river/lake is wide. Estimate and plan the water storage volume of the non-closure water conservancy system according to local hydrological data and research on the maximum rainfall in hundred years and the natural environment in drought periods, so that it can effectively regulate water resources by storing the water in the reservoir in flood periods and discharging the water in drought periods.

In a third aspect of the invention, in order to facilitate quick construction of the above water conservancy system, the invention provides a concrete precast assembly, which includes a plurality of individual concrete precast member. Each member is reserved with a T-shape mortise groove, and the members are each mortised with each other through a first member (H-mortise unit), and each precast member is provided with honeycomb holes and lifting holes or rings, and pouring grout into the honeycomb holes can improve the firmness of the precast member.

The invention provides a concrete precast assembly, comprising a first member, a second member, a third member, a fourth member and a fifth member, wherein the first member is a pillar structure with an H-shape cross-section, used for the mortising between other members; the left side and the right side of the second member are right angle trapeziums and the rest surfaces are rectangular, a T-shape mortise groove fitting with the first member provided respectively on the left side and the right side along the height direction; the third member has an overall cuboid-shape structure, a T-shape mortise groove fitting with the first member provided along the height direction of the cuboid-shape at two ends; the fourth member has an overall cuboid-shape structure, a T-shape mortise groove fitting with the first member provided along the height direction of the cuboid-shape at the left and right sides and the rear side; the fifth member has an overall cuboid-shape structure, a T-shape mortise groove fitting with the first member provided along the height direction of the cuboid-shape at the left and right sides, the left and right sides provided with honeycomb holes. Further, the concrete precast assembly further comprises a sixth member which is a concrete rectangular reinforcing rib having an overall cuboid-shape structure. Preferably, grooves are arranged at the upper and lower sides of the second member, third member, fourth member and the fifth member; during assembly, the sixth member is placed in the groove for the connection between the upper layer and lower layer structures, thereby increasing the connection stability between the upper layer and lower layer structures.

Further, in order to be adapted to the riparian arc terrain, the third member in the concrete precast assembly may be curved, for use at the arc at the river bank. Preferably, the radius of the inner arc of the arcuate third member is equal to half of the distance between the pillars. Here, the distance between the pillars is referred to the distance connecting the pillar central lines of the arcuate third member. Preferably, the sixth member may also be arcuate. During assembly, the sixth member is placed in the groove of the arcuate third member for the connection between the upper and lower layer structures, thereby increasing the connection stability between the upper and lower layer structures.

Preferably, the second member is provided with two sets of T-shape mortise grooves, wherein a first set of T-shape mortise grooves are arranged to connect the upper underside with the lower underside of the second member, with one each on the left and right sides; a second set of T-shape mortise grooves are arranged to connect the front side slope with the lower underside of the second member, with one each on the left and right sides.

In the invention, the side of the dam facing the water is defined as the front, the side facing away from the water as the rear, and correspondingly, the side of each member facing the water is defined as the front side, the side facing away from the water as the rear side.

By using the piles, beams, pillars and concrete gravity dam protection assembly precast in factory according to the invention, construction of the non-closure water conservancy system of the invention and hoisting in the planned location are not affected by weather, effectively guaranteeing the quality and schedule. T-shape engaging mortise grooves are designed around the fabricated unitized wall of the dam protection assembly, and H-shape mortise unit can thus be inserted to engage the mortise groove after assembly and locating of the two assemblies. Then fine aggregate concrete is used for infilling and securing, each chunk being installed continuously to form the dam.

Referring now to the figures, the conception, detailed structure and induced technical effect of the present invention will be expounded for due understanding of the purpose, characterizations and effects of the present invention.

DETAILED DESCRIPTION

Embodiment 1

Figure 1:
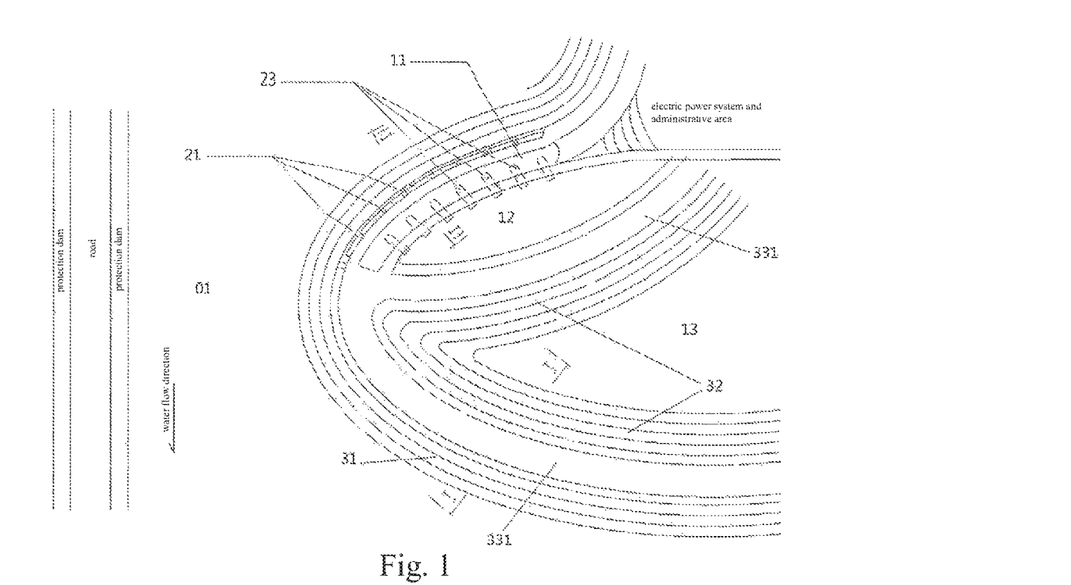
FIG. 1 is an overall schematic plan view of a preferred embodiment of the present invention.

As shown in FIG. 1, the invention provides a water conservancy system 1, which employs a non-closure mode and is built on one side of a river/lake waterway, including a water storage system 1 and a first water passage 21. The water storage system is communicated with the river/lake waterway 01 through the first water passage 21. The water conservancy system also includes a second water passage 22, which is arranged downstream of the first water passage 21 and connects the water storage system 1 with the river/lake waterway 01.

The water storage system 1 includes a first precipitation reservoir 11, a second precipitation reservoir 12 and a storage reservoir 13. The river/lake water enters into the first precipitation reservoir 11 through the first water passage 21 for a preliminary precipitation, and after that, enters into the second precipitation reservoir 12 for another precipitation before entering into the storage reservoir 13. The first water passage 21 connects the first precipitation reservoir 11 with the river/lake waterway 01, and the second water passage 22 connects the storage reservoir 13 with the river/lake waterway 01. In the overall layout of the water storage system, from upstream to downstream, respectively, are arranged with the first precipitation reservoir 11, second precipitation reservoir 12 and storage reservoir 13. A power system and a management area are set up upstream of the water conservancy system.

Figure 2:
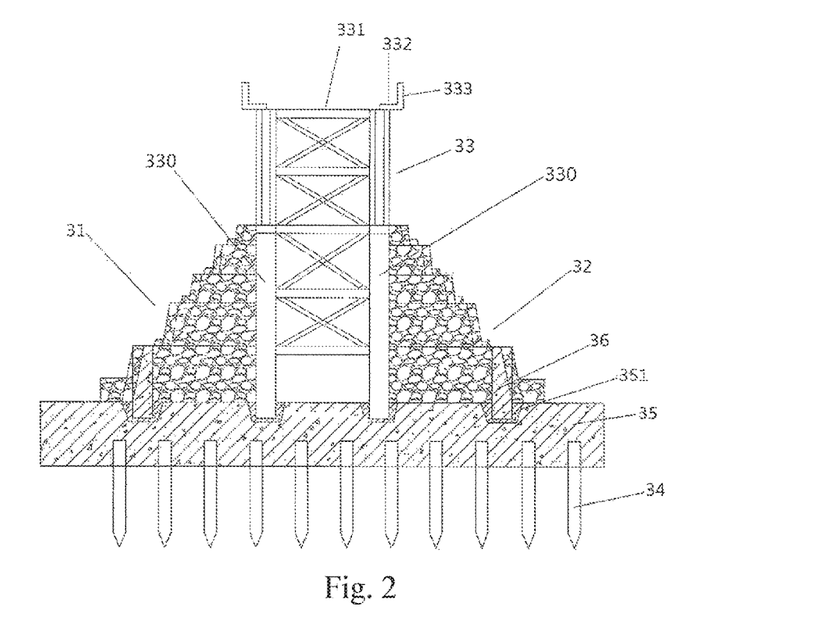
FIG. 2 is a sectional view taken along I-I in FIG. 1.

Referring to FIG. 2, both sides of the dam 3 of the water conservancy system are stepped curved slope protection concrete structures. In particular construction, the dam 31 of the water conservancy system at the side adjacent the river/lake waterway is a concrete structure, and the dam 32 at the other side is a rubble structure, thereby reducing construction costs. Of course, both sides may also be rubble structure. The intermediate portion 33 of the dam is formed by two concrete walls 330. The heights of the two concrete walls 330 exceed the highest water level in flood periods in a century; the top of the intermediate portion 33 is a road, which includes a driveway 331 and a sidewalk 332, and a fence 333 is provided outside of the sidewalk 332. In the dam construction process, concrete piles 34 are first driven in accordance with the design drawings; after cleaning up a whole concrete support platform 35 is formed from pouring, and a base groove 351 for concrete pillar is reserved when pouring; a gravity concrete pillar 36 is hoisted into the groove 351 and the groove 351 is filled with concrete for reinforcement; then, in turn, dams 31, 32 on both sides and the concrete walls 330 of the intermediate portion 330 are built. Concrete pouring or precast concrete construction may be employed between the concrete walls 330, and filling with sands and stones may also be employed.

Figure 3:
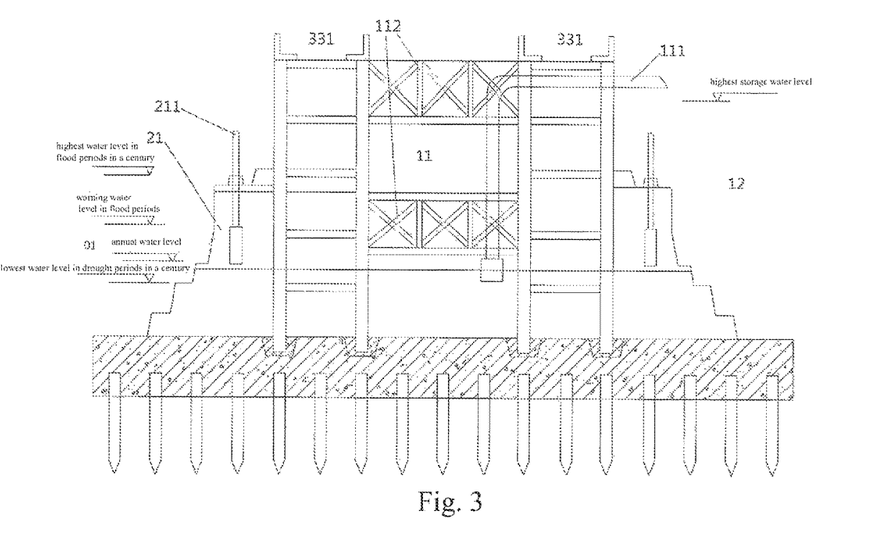
FIG. 3 is a sectional view taken along II-II in FIG. 1.

Referring to FIG. 3, a plurality of the first water passage 21 is arranged on the dam between the first precipitation reservoir 11 and the river/lake waterway 01; the inlet of the first water passage 21 is provided with a separation net for preventing the floating debris from entering, and the inlet is provided with a regulatory sluice 211 for regulation of river/lake water into the first precipitation reservoir 11; wherein the bottom of the first water passage 21 levels with the mean annual water level, and the top of the first water passage 21 levels with the highest water level in flood periods in a century. A drainage mechanism 111 is provided in the first precipitation reservoir for facilitating the drainage from the first precipitation reservoir 11 to the second precipitation reservoir 12. Steel trusses 112 are provided above and inside the first precipitation reservoir 11.

Figure 4:
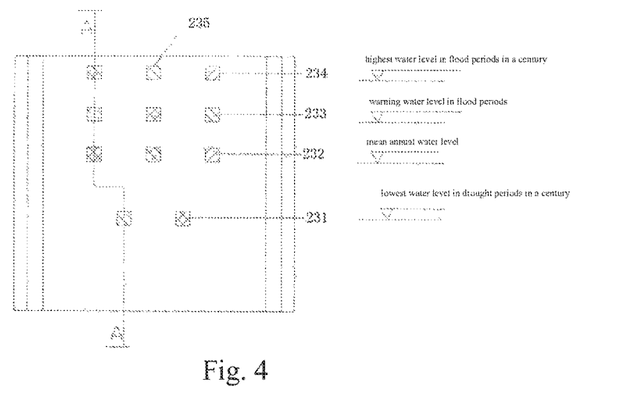
FIG. 4 is a schematic view of the water passage of a preferred embodiment of the present invention.
Figure 5:
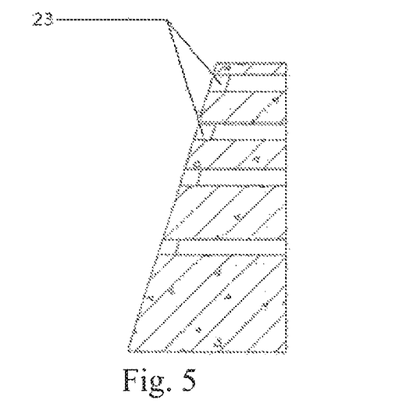
FIG. 5 is a sectional view taken along A-A in FIG. 4.

Referring to FIGS. 4 and 5, a plurality of sets of automatic overflow passages 23 are provided on the dam between the first precipitation reservoir 11 and the second precipitation reservoir 12. In this embodiment, four sets of automatic overflow passages are provided, which, respectively, are: a first set of automatic overflow passages 231, a second set of automatic overflow passages 232, a third set of automatic overflow passages 233, and a fourth set of automatic overflow passages 234, with a separation net 235 provided at the inlet of each of the overflow passages; wherein the first set of automatic overflow passages 231 levels with the low water level in drought periods in a century, the second set of automatic overflow passages 232 levels with the mean annual water level, the third set of automatic overflow passages 233 levels with flood warning water level, and the fourth set of automatic overflow passages 234 levels with the highest water level in flood periods in a century. Each set of automatic overflow passages is in parallel arrangement on the same horizontal plane, and the area or number of each set of automatic overflow passages is determined in design, with the area or number of the first set of automatic overflow passages being less than the number of automatic overflow passages in other sets.

A plurality of sets water passages, with the same structure as the automatic overflow passages 23 provided on the dam between the first precipitation reservoir 11 and the second precipitation reservoir 12, are provided on the dam between the second precipitation reservoir 12 and the storage reservoir 13. In other embodiments, overflow passages with the same structure as the above automatic overflow passages 23 may also be provided on the dam between the first precipitation reservoir 11 and the river/lake waterway 01.

Figure 6:
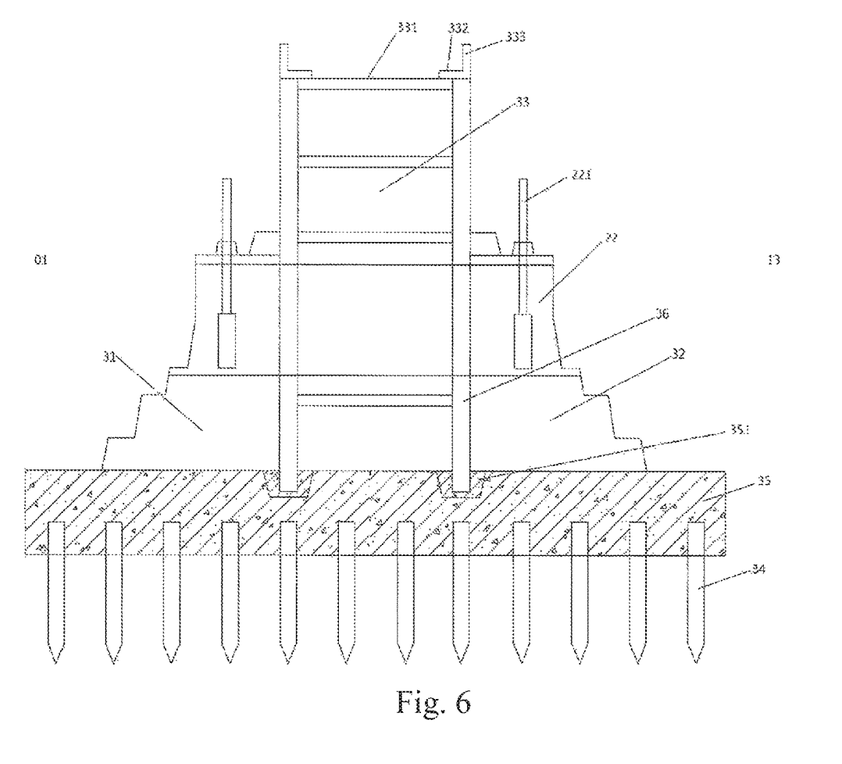
FIG. 6 is a schematic view of a second water passage in a preferred embodiment of the present invention.

Referring to FIG. 6, a plurality of the second water passage 22 is provided on the dam between the storage reservoir 13 and the river/lake waterway 01; a regulatory sluice 221 is provided at the inlet of the second water passage 221, for the regulation of the entering of the water from the reservoir into the river/lake waterway 01; the bottom of the second water passage 22 levels with the low water level in drought periods in a century, and the top of the second water passage 22 levels with the highest water level in flood periods in a century. Optionally, a hydroelectric system or irrigation system may be provided in the second water passage.

In other embodiments of the invention, a pumping mechanism may be provided between the river/lake waterway 01 and the first precipitation reservoir 11, between the first precipitation reservoir 11 and the second precipitation reservoir 12, between the second precipitation reservoir 12 and the storage reservoir 13, and between the storage reservoir 13 and the river/lake waterway 01, for facilitating the entering and exiting of water.

In the present invention, the main function of the first precipitation reservoir 11 is to introduce the flood water exceeding the warning water level in flood periods into the reservoir, so as to allow for self-precipitation, and part of the water will be automatically discharged into the second precipitation reservoir 12 when the water level in the first precipitation reservoir 11 reaches a certain designed height; the flood water exceeding the warning water level in the first precipitation reservoir is pumped into the second precipitation reservoir by making full use of the drainage mechanism 111 when the water level exceeds the design height. Part of the water will be automatically discharged into the storage reservoir 13 when the water level in the second precipitation reservoir 12 reaches a certain designed height; a drainage mechanism may also be provided in the second precipitation reservoir 12, and the flood water exceeding the warning water level in the second precipitation reservoir is pumped into the storage reservoir 13 by making use of the drainage mechanism when the water level exceeds the designed height. The storage reservoir can act to regulate drought and flood by discharging water or generate electricity in drought periods when the water volume is large. A mode to implement this is as follows: opening the regulatory sluice 211 of the first water passage 21 when the water level exceeds the flood water level, to introduce the water from the river/lake into the first precipitation reservoir 11, then introducing the water from the first precipitation reservoir 11 into the second precipitation reservoir 12 through the automatic overflow passages and/or the pumping mechanism. When the river/lake water level is low, the water in the storage reservoir 13 can be supplied to the river/lake through the second water passage 22, so as to regulate the water level. Electricity can be generated from water during discharging out and in, and the water in the storage reservoir 13, after two times of precipitation, can also be utilized for irrigation and domestic use.

Figure 7:
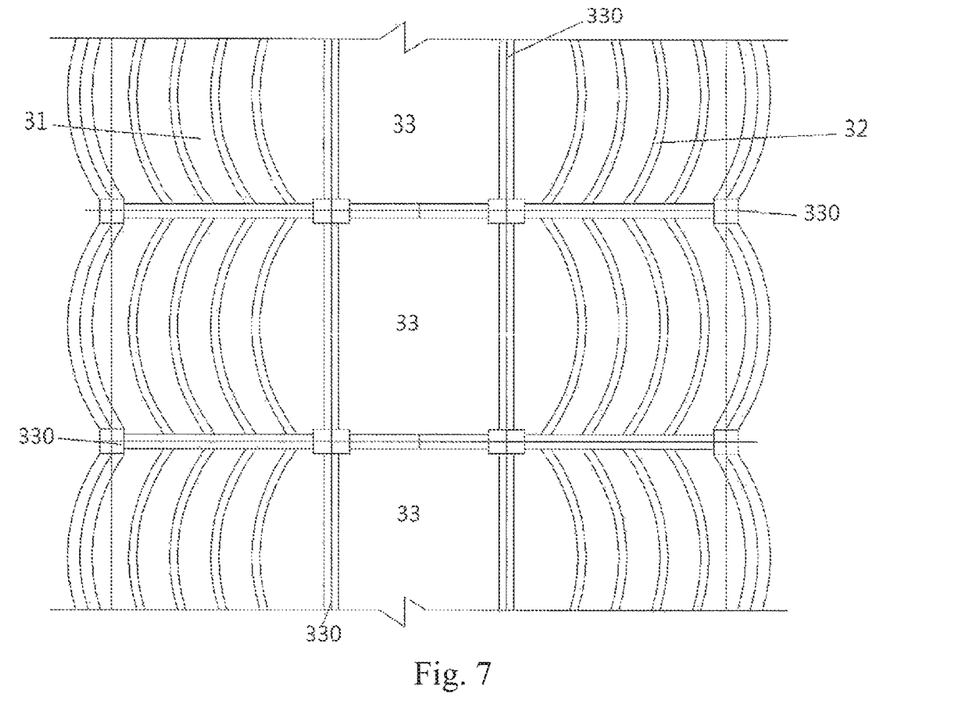
FIG. 7 is a partial plan view of the water conservancy system in a preferred embodiment of the present invention.

Referring to FIG. 7, in order to make the dam more solid and easy to be constructed, in some embodiments, a concrete wall 330 perpendicular to the dam can also be built in addition to the intermediate portion built with a concrete wall 330, thus dividing the whole dam into a number of areas, significantly increasing the strength of the dam.

The water conservancy system as described in the invention is suitable to be built in urban areas with relatively small population downstream of the city, and non-farm zones with low-lying area at shoreline where the river/lake is wide.

Embodiment 2

This embodiment provides a concrete precast assembly, which includes a plurality of individual concrete precast member. Each member is reserved with a T-shape mortise groove, and the members are each mortised with each other through a first member 41 (H-mortise unit), and each precast member is provided with honeycomb holes and lifting holes or rings, and pouring grout into the honeycomb holes can improve the firmness of the precast member.

The concrete precast assembly in this embodiment includes a first member 41, a second member 42, a third member 43, a fourth member 44 and a fifth member 45.

Figure 8:
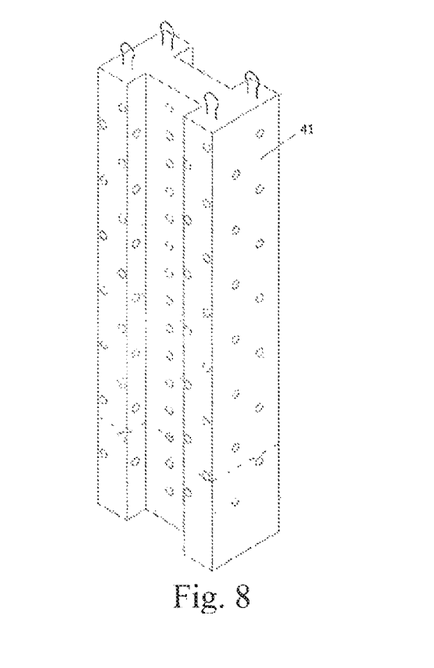
FIG. 8 is a schematic view of a first member in a preferred embodiment of the present invention.

As shown in FIG. 8, the first member 41 is an H-shape mortise in a unitized structure with an H-shape cross-section, for mortising between other members. Each surface is provided with honeycomb holes provided with rings for easy hoisting.

Figure 9:
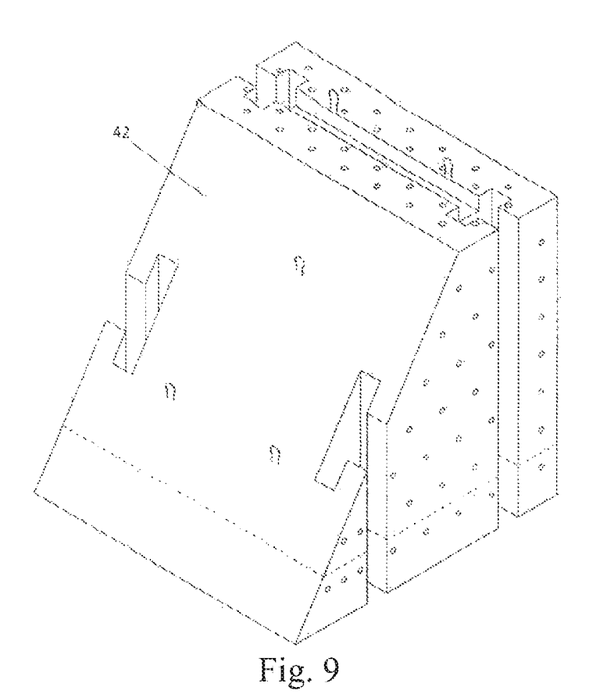
FIG. 9 is a schematic view of a second member in a preferred embodiment of the invention.

As shown in FIG. 9, the second member 42 is in unitized structure used as the slope protection for the underlying structure of the dam, with the left side and the right side being right angle trapeziums and the rest surfaces being rectangular, the upper length of the angle trapezoidal being ⅓-½ of the lower length thereof. A T-shape mortise groove fitting with the H-shape mortise unit of the first member is provided respectively on the left side and the right side, and surfaces other than the front side slope are provided with honeycomb holes, and rings are provided on the front side slope and the upper underside. The second member is provided with two sets of T-shape mortise grooves, in which a first set of T-shape mortise grooves are arranged to connect the upper underside with the lower underside of the second member, with one each on the left and right sides; the second set of T-shape mortise grooves are arranged to connect the front side slope with the lower underside of the second member, with one each on the left and right sides. The second member 42 is in unitized structure used as the slope protection for the underlying layer of the dam, used for the underlying layer of the concrete wall of the dam as a base for the concrete wall of the dam, which is assembled together with capping beam unit of the third member 43, acting to support and stabilize the dam.

Figure 10:
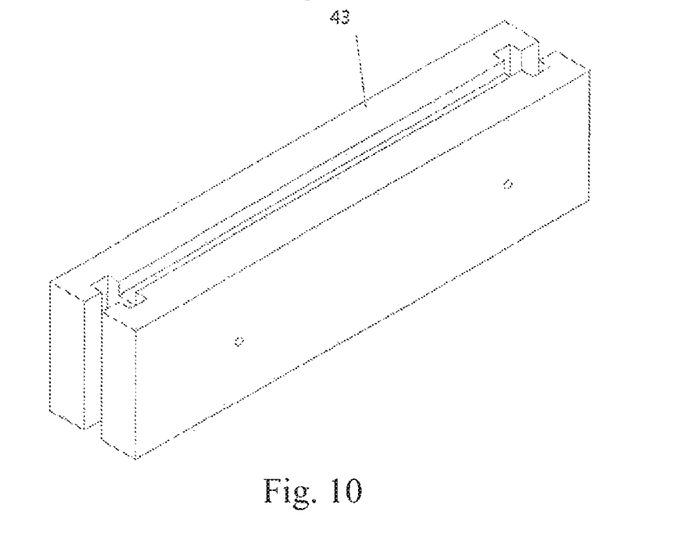
FIG. 10 is a schematic view of a third member in a preferred embodiment of the invention.

As shown in FIG. 10, the third member 43 is capping beam unitized structure, mounted on the second member 42, with an overall cuboid-shape structure, provided with T-shape mortise grooves on the right and left ends, mainly bearing the bending moments and shear forces.

Figure 11:
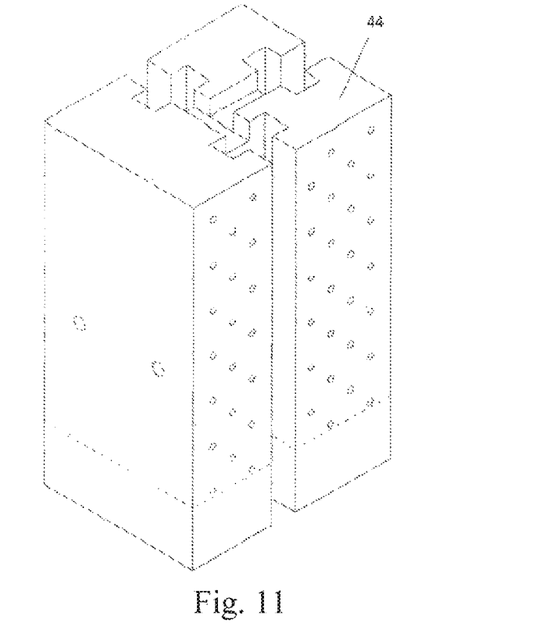
FIG. 11 is a schematic view of a fourth member in a preferred embodiment of the invention.

As shown in FIG. 11, the fourth member 44 is a fabricated gravity pillar unitized structure, with an overall cuboid-shape structure, provided with T-shape mortise grooves in the vertical direction at the left and right sides and the rear side, assembled together with the fifth member 45 and used at the joint with the concrete wall for increasing the stability of the dam.

Figure 12:
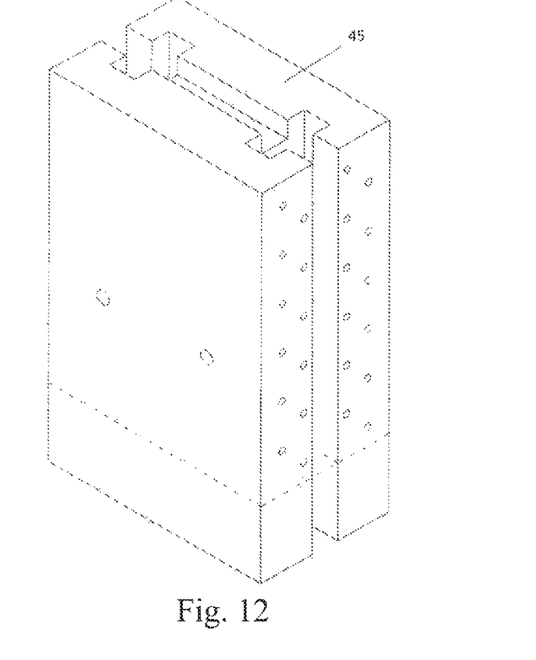
FIG. 12 is a schematic view of a fifth member in a preferred embodiment of the invention.

As shown in FIG. 12, the fifth member 45 is fabricated unitized wall structure, with an overall cuboid-shape structure, provided with T-shape mortise grooves in the vertical direction at the left and right sides, and the left and right sides are provided with honeycomb holes. The first member 41 is an H-shape mortise monomer structure with its mortising portion being smaller by 30 mm each than the length and width of the T-shape mortise grooves of other members, so as to facilitate assembly.

Figure 13:
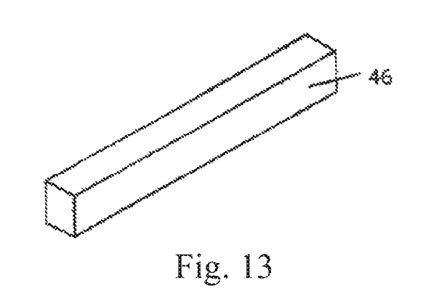
FIG. 13 is a schematic view of a sixth member in a preferred embodiment of the invention.

In this embodiment, the concrete precast assembly further includes a sixth member 46, as shown in FIG. 13. The sixth member 46 is a concrete rectangular reinforcing rib with an overall cuboid-shape structure. Grooves are arranged at the upper and lower sides of the second member 42, third member 43, fourth member 44 and the fifth member 45, with the groove depth being about half the height of the sixth member 46. During assembly, the sixth member 46 is placed in the groove for the connection between the upper layer and lower layer structures, thereby increasing the connection stability between the upper layer and lower layer structures.

Figure 14:
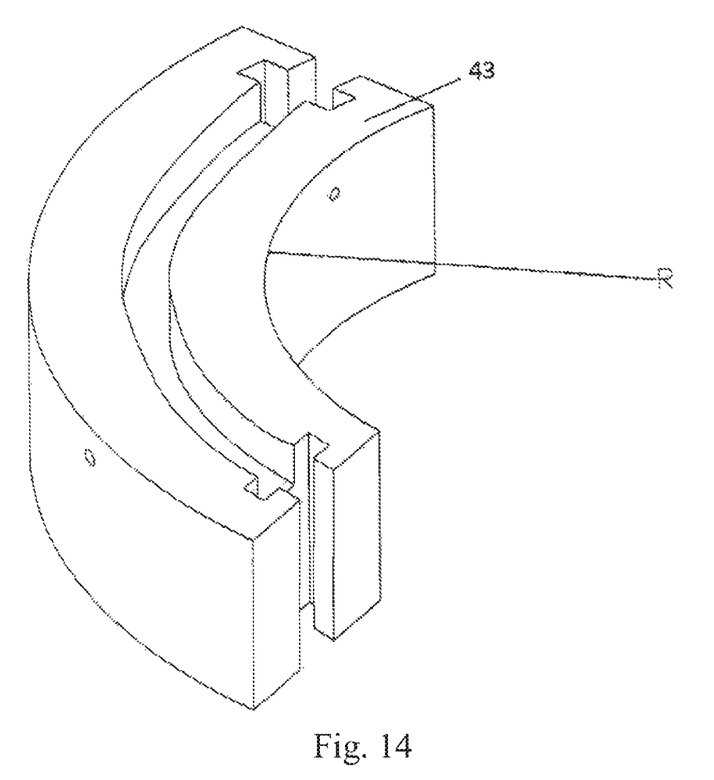
FIG. 14 is schematic view of a curved third member in a preferred embodiment of the invention.

In order to be adapted to the riparian arc terrain, the third member 43 in the concrete precast assembly may be curved, as shown in FIG. 14, for use at the curved river banks. The radius of the inner arc of the curved third member is equal to half of the distance between the pillars of the fourth members 44 at both sides of the third member. Accordingly, the sixth member may also be curved. During assembly, the sixth member is placed in the groove of the curved third member for the connection between the upper layer and lower layer structures, thereby increasing the connection stability between the upper layer and lower layer structures.

Figure 15:
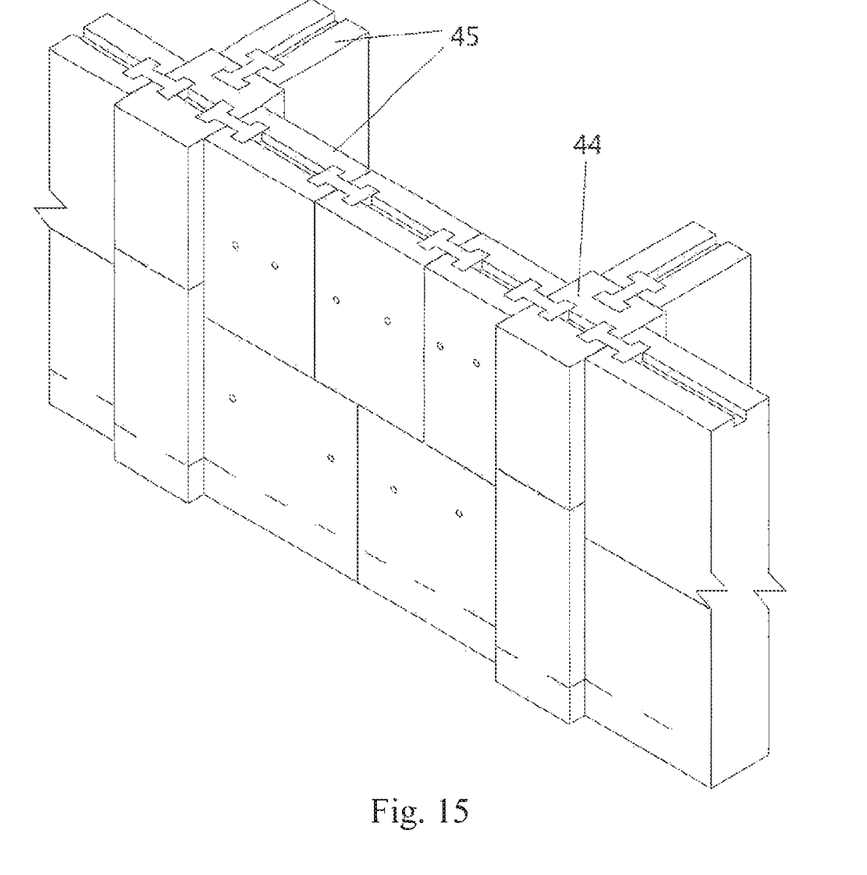
FIG. 15 is a partial schematic view of a concrete wall formed from assembly and combination of various members in a preferred embodiment of the present invention.

As shown in FIG. 15, part of the concrete wall formed from assembly and combination of various members in this embodiment is shown.

In the invention, the side of the dam facing the water is defined as the front, the side facing away from the water as the rear, and correspondingly, the side of each member facing the water is defined as the front side, the side facing away from the water as the rear side.

By using the piles, beams, pillars and concrete gravity dam protection assembly precast in factory according to the invention, construction of the non-closure water conservancy system of the invention and hoisting in the planned location are not affected by weather, effectively guaranteeing the quality and schedule. T-shape engaging mortise grooves are designed around the fabricated unitized wall of the dam protection assembly, and H-shape mortise unit can thus be inserted to engage the mortise groove after assembly and locating of the two assemblies. Then fine aggregate concrete is used for infilling and securing, each chunk being installed continuously to form the dam.

The foregoing described the preferred embodiments of the present invention. It should be understood that an ordinary person skilled in the art can make many modifications and variations according to the concept of the present invention without creative work. Therefore, any person skilled in the art can get any technical solution through logical analyses, deductions and limited experiments, which should fall in the protection scope defined by the claims.

The invention claimed is:

1. A method for regulation of a river/lake level, wherein a non-flowstopping mode is employed, and a water storage system is built inside a river/lake along one side of the river/lake, the method comprising:
   directing water from the river/lake into the water storage system when the river/lake level exceeds an alert water level, thereby lowering the river/lake level or reducing the rising velocity of the river/lake level; and
   replenishing the river/lake with the water stored in the water storage system when the river/lake level is unduly low, thereby increasing the river/lake level or reducing the lowering velocity of the river/lake level;

arranging a first water passage at one side of an embankment of the river/lake to connect the river/lake with the water storage system, the inlet of the first water passage including a sluice; and arranging a second water passage downstream of the first water passage to connect the river/lake with the water storage system, the inlet of the second water passage including a sluice.

2. A water conservancy system employing a non-flow-stopping mode, built inside a river/lake waterway along one side of the river/lake waterway and comprising a water storage system and a first water passage and a second water passage, the water storage system communicating with the river/lake waterway through the first water passage, the first water passage including an inlet having a sluice, the second water passage being arrange downstream of the first water passage and connecting the water storage system with the river/lake waterway, the second water passage including an inlet having a sluice.

3. The water conservancy system as claimed in claim 2, further comprising a first precipitation reservoir and a storage reservoir, the first precipitation reservoir and the storage reservoir being in communication through the first and second water passages, the first water passage connecting the first precipitation reservoir with the river/lake waterway, the second water passage connecting the storage reservoir with the river/lake waterway.

4. The water conservancy system as claimed in claim 3, further comprising a second precipitation reservoir in communication respectively with the first precipitation reservoir and the storage reservoir, the river/lake water enters into the first precipitation reservoir through the first water passage for a preliminary precipitation and, after that, enters into the second precipitation reservoir for further precipitation before entering into the storage reservoir.

5. The water conservancy system as claimed in claim 4, further comprising a plurality of the first water passages arranged on a dam between the first precipitation reservoir and the river/lake waterway, an inlet of at least one of the first water passages being provided with a separation net for preventing floating debris from entering, and a regulatory sluice is provided at the inlet for the regulation of river/lake water into the first precipitation reservoir; the bottom of the first water passage levels with the mean annual water level, the top of the first water passage levels with the highest water level in flood periods in a century.

6. The water conservancy system as claimed in claim 4, wherein a plurality of the second water passages are provided on a dam between the storage reservoir and the river/lake waterway; a regulatory sluice is provided at the inlet of the second water passage, for the regulation of the water from the storage reservoir into the river/lake waterway; the bottom of the second water passage levels with the low water level in drought periods in a century, and the top of the second water passage levels with the highest water level in flood periods in a century.

7. The water conservancy system as claimed in claim 2, further comprising a dam having a stepped and curved slope protection structure, the height of the dam exceeding the highest water level in flood periods in a century.

8. The water conservancy system as claimed in claim 7, wherein the dam is at a side adjacent the river/lake waterway and is a concrete structure, and another dam is at the other side of the river/lake waterway and is a rubble structure.

9. The water conservancy system as claimed in claim 7, wherein a plurality of sets of automatic overflow passages are provided on the dam between the first precipitation reservoir and the second precipitation reservoir.

10. The water conservancy system as claimed in claim 9, wherein at least four sets of automatic overflow passages are provided, which, respectively, are: a first set of automatic overflow passages, a second set of automatic overflow passages, a third set of automatic overflow passages and a fourth set of automatic overflow passages, with a separation net provided at the inlet of each of the overflow passages; wherein the first set of automatic overflow passages levels with the low water level in drought periods in a century, the second set of automatic overflow passages levels with the mean annual water level, the third set of automatic overflow passages levels with the alert water level in flood periods, and the fourth set of automatic overflow passages levels with the highest water level in flood periods in a century.

11. The water conservancy system as claimed in claim 7, wherein a plurality of sets of automatic overflow passages are provided on the dam between the second precipitation reservoir and the storage reservoir.

12. The water conservancy system as claimed in claim 11, wherein at least four sets of automatic overflow passages are provided, which, respectively, are: a first set of automatic overflow passages, a second set of automatic overflow passages, a third set of automatic overflow passages, and a fourth set of automatic overflow passages; wherein the first set of automatic overflow passages levels with the low water level in drought periods in a century, the second set of automatic overflow passages levels with the mean annual water level, the third set of automatic overflow passages levels with the alert water level in flood periods, and the fourth set of automatic overflow passages levels with the highest water level in flood periods in a century.

* * * * *